United States Patent [19]
Lee

[11] Patent Number: 5,991,045
[45] Date of Patent: Nov. 23, 1999

[54] COLOR ANALYZER FOR USE WITH LIGHT-EMITTING AND NON-LIGHT-EMITTING TEST OBJECTS

[75] Inventor: Neng-Sung Lee, Taipei, Taiwan

[73] Assignee: Chroma Ate Inc., Taipei, Taiwan

[21] Appl. No.: 09/231,051

[22] Filed: Jan. 14, 1999

[51] Int. Cl.$^6$ .................................................... G01J 3/51
[52] U.S. Cl. ..................... 356/419; 356/420; 250/226
[58] Field of Search .................................. 356/402, 405, 356/406, 416, 418, 419, 420; 250/226

[56] References Cited

U.S. PATENT DOCUMENTS

| | | | |
|---|---|---|---|
| 2,358,020 | 9/1944 | Miller | 250/226 |
| 3,910,701 | 10/1975 | Henderson et al. | 250/226 |

*Primary Examiner*—F. L. Evans
*Attorney, Agent, or Firm*—Ladas & Parry

[57] ABSTRACT

A color analyzer is capable of determining the color property of a test object, and includes a light collector having a first end formed with a test opening and adapted to be placed in juxtaposition with the test object, a second end, and a light channel extending from the test opening to the second end. A lighting unit is mounted on the light collector, and is operable in order to generate light outputs of different wavelengths. A color filter device is movably disposed in the light collector, and includes a transparent filter and three color filters. A filter-shifting unit is associated with the color filter device, and is operable so as to move the color filter device in the light collector in order to align the filters within the light channel. A photoelectric sensor produces an electric output signal corresponding to the light leaving the color filter device. A signal-processing unit is connected to the photoelectric sensor to process the output signal of the photoelectric sensor in order to determine the color property of the test object.

33 Claims, 2 Drawing Sheets

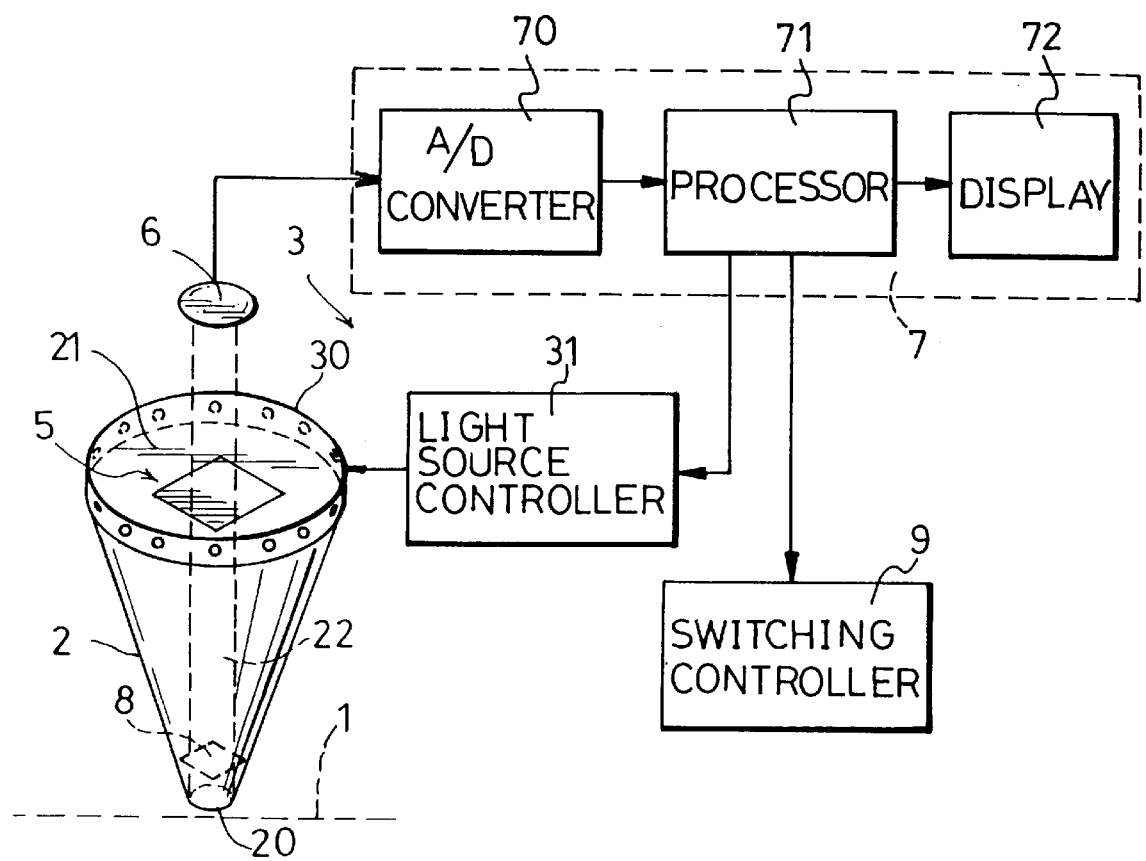
F I G. 1

COLOR ANALYZER FOR USE WITH LIGHT-EMITTING AND NON-LIGHT-EMITTING TEST OBJECTS

BACKGROUND OF THE INVENTION

1. Field of the Invention

The invention relates to a color analyzer, more particularly to a color analyzer that is capable of determining the color property of a light-emitting test object, such as a computer monitor, and/or a non-light-emitting test object, such as a sheet of paper.

2. Description of the Related Art

Color analyzers are employed to determine the color of light emitted by a light-emitting test object or the color of a surface of a non-light-emitting test object. In conventional color analyzers, the light that is emitted by a light-emitting test object, or the light that is generated by a light source and that is reflected by the surface of a non-light-emitting test object, is collected and passed through a color splitting device having a particular spectral response. The split light is then converted into electrical signals by photoelectric sensors. The electrical signals are provided to a processor, which is responsible for calculating the color value of the light leaving the test object.

Conventional color analyzers are capable of determining only the color of light emitted by a light-emitting test object, or only the color of the surface of a non-light-emitting test object. In addition, conventional color analyzers have relatively complex constructions, thereby resulting in difficulty during production and in higher production costs. This is especially true for color analyzers that are adapted for use with non-light-emitting test objects and that normally utilize diffraction gratings for splitting reflected light.

SUMMARY OF THE INVENTION

Therefore, the main object of the present invention is to provide a color analyzer that is capable of determining the color property of a light-emitting test object and/or a non-light-emitting test object, thereby resulting in enhanced utility.

Another object of the present invention is to provide a color analyzer that has a relatively simple construction to facilitate production and lower production costs.

According to one aspect of the present invention, a color analyzer is employed to determine the color property of a test object, the color property being the color of light that is emitted by the test object when the test object is a light-emitting test object, and being the color of a surface of the test object when the test object is a non-light-emitting test object. The color analyzer comprises a light collector, a lighting unit, a color filter device, a filter-shifting unit, a photoelectric sensor and a signal-processing unit. The light collector has a first end formed with a test opening and adapted to be placed in juxtaposition with the test object, a second end, and a light channel extending from the test opening to the second end. The test opening is adapted to permit entry of the light from the test object into the light channel. The lighting unit is mounted on the light collector, and is operable when the test object is a non-light-emitting test object. The lighting unit includes a plurality of differently colored light sources to generate light outputs of different wavelengths that pass through the test opening so as to be reflected by the surface of the non-light-emitting test object into the light channel via the test opening. The color filter device is movably disposed in the light collector, and includes four optical filters, one of the optical filters being a transparent filter, the other three of the optical filters being color filters that cooperate with the spectral response of the photoelectric sensor to form CIE 1931 color matching functions. The filter-shifting unit is associated with the color filter device, and is operable so as to move the color filter device in the light collector in order to align the transparent filter within the light channel when the test object is a non-light-emitting test object, and in order to align sequentially the color filters within the light channel when the test object is a light-emitting test object. The photoelectric sensor produces an electric output signal corresponding to the light leaving the color filter device. The signal-processing unit is connected to the photoelectric sensor to process the output signal of the photoelectric sensor in order to determine the color property of the test object.

According to another aspect of the present invention, a color analyzer is capable of determining the color of light that is emitted by a light-emitting test object, and comprises a hollow light collector, a color filter device, a filter-shifting unit, a photoelectric sensor, and a signal-processing unit. The light collector has a first end formed with a test opening and adapted to be placed in juxtaposition with the test object, a second end, and a light channel extending from the test opening to the second end. The test opening is adapted to permit entry of the light from the test object into the light channel. The color filter device is movably disposed in the light collector, and includes at least three optical filters that cooperate with the spectral response of the photoelectric sensor to form CIE 1931 color matching functions. The optical filters are disposed side-by-side in a common plane transverse to the light channel, and form corner portions of a rectangular formation. The filter-shifting unit is associated with the color filter device, and is operable so as to move the color filter device in the light collector in order to align sequentially the optical filters within the light channel. The filter-shifting unit includes a transparent platform that is disposed in the light collector transverse to the light channel and that has the color filter device movably provided thereon, a permanent magnet unit mounted on the color filter device so as to be movable therewith on the platform, and an electromagnet unit mounted on a periphery of the platform and operable so as to generate a magnetic repulsion force with the permanent magnet unit in order to move the color filter device on the platform and align a desired one of the optical filters within the light channel. The photoelectric sensor produces an electric output signal corresponding to the light leaving the color filter device. The signal-processing unit is connected to the photoelectric sensor to process the output signal of the photoelectric sensor in order to determine the color of the light emitted by the test object.

According to a further object of the present invention, a color analyzer is capable of determining the color of a surface of a non-light-emitting test object, and comprises a hollow light collector, a lighting unit, a photoelectric sensor and a signal-processing unit. The light collector has a first end formed with a test opening and adapted to be placed in juxtaposition with the test object, a second end, and a light channel extending from the test opening to the second end. The lighting unit includes a plurality of light sources that are equiangularly disposed on the light collector and that are operable in sequence so as to generate light outputs of different wavelengths that pass through the test opening so as to be reflected by the surface of the test object into the light channel via the test opening. The light sources are mounted on an inner wall surface of the light collector at the second end, and incline by a 45° angle toward the test opening. The photoelectric sensor produces an electric output signal corresponding to the light leaving the light channel at the second end of the light collector. The signal-processing unit is connected to the photoelectric sensor to process the output signal of the photoelectric sensor in order to determine the color of the surface of the test object.

BRIEF DESCRIPTION OF THE DRAWINGS

Other features and advantages of the present invention will become apparent in the following detailed description of the preferred embodiment with reference to the accompanying drawings, of which:

FIG. 1 is a schematic view of the preferred embodiment of a color analyzer according to the present invention;

DETAILED DESCRIPTION OF THE PREFERRED EMBODIMENT

Figure 2:
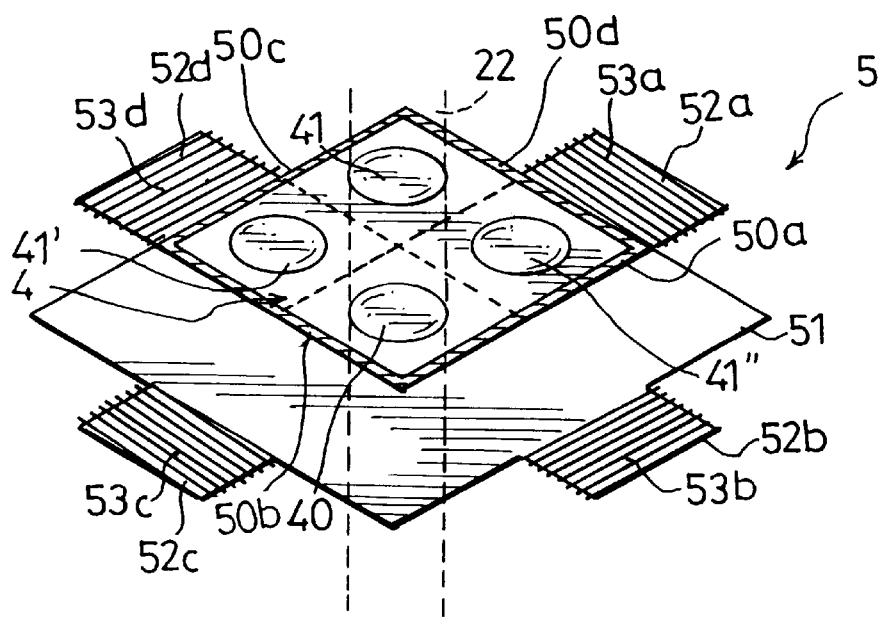
FIG. 2 is a perspective view of a color filter device and a filter-shifting unit of the preferred embodiment.

Referring to FIGS. 1 and 2, the preferred embodiment of a color analyzer according to the present invention is adapted to determine the color property of a test object 1. The test object 1 can be a light-emitting test object, such as a computer monitor, or a non-light-emitting test object, such as a sheet of paper. The color analyzer comprises a light collector 2, a lighting unit 3, a color filter device 4, a filter-shifting unit 5, a photoelectric sensor 6, a signal-processing unit 7, a shutter device 8 and a switching controller 9.

The light collector 2 is formed as a hollow cone-shaped member made of an opaque material. The light collector 2 has a narrow first end formed with a test opening 20 and adapted to be placed in juxtaposition with the test object 1. The light collector 2 further has a wide second end 21 and a light channel 22 extending from the test opening 20 through the wide second end 21. The test opening 20 is adapted to permit entry of light from a light-emitting test object 1 into the light channel 22.

The lighting unit 3 includes a plurality of light sources 30 that generate light outputs of different wavelengths when activated, and a light source controller 31 that is connected to the light sources 30 so as to control activating sequence of the light sources 30 and intensity of the light outputs of the light sources 30. The light sources 30 are equiangularly mounted on an inner wall surface of the wide second end 21 of the light collector 2, and incline by a 45° angle toward the test opening 20. Preferably, the lighting unit 3 includes a plurality of differently colored light emitting diodes that serve as the light sources 30. When it is desired to determine the color of the surface of a non-light-emitting test object 1, the light sources 30 are activated by the light source controller 31 in sequence to generate the light outputs of different wavelengths that pass through the test opening 20 so as to be reflected by the surface of the test object 1 into the light channel 22 via the test opening 20. The light source controller 31 is connected to and controlled by the signal-processing unit 7 in order to control the activating sequence of the light sources 30 and the intensity of the light outputs of the light sources 30.

The color filter device 4 is disposed in the light collector 2, and includes four optical filters that are disposed side-by-side in a common plane transverse to the light channel 22 and that form four corner portions of a rectangular formation. One of the optical filters is a transparent filter 40. The remaining three of the optical filters are color filters 41, 41', 41" that cooperate with the spectral response of the photoelectric sensor 6 according to the color matching functions defined in CIE 1931 by the Comité International d'Eclairage.

The filter-shifting unit 5 is connected to the switching controller 9 and is responsible for moving the color filter device 4 in the light collector 2 in order to align a selected one of the filters 40, 41, 41', 41" within the light channel 22. The switching controller 9 is connected to the signal-processing unit 7 and is controlled by the latter. When the test object 1 is a non-light-emitting test object, the switching controller 9 is activated by the signal-processing unit 7 to control the filter-shifting unit 5 and move the color filter device 4 such that the transparent filter 40 is aligned within the light channel 22. When the test object 1 is a light-emitting test object, the switching controller 9 is activated by the signal-processing unit 7 to control the filter-shifting unit 5 and move the color filter device 4 such that the color filters 41, 41', 41" are aligned in sequence within the light channel 22.

In the preferred embodiment, the filter-shifting unit 5 includes a rectangular transparent platform 51 that is disposed in the light collector 2 transverse to the light channel 22, and that has the color filter device 4 movably provided thereon. The platform 51 has a size sufficient to permit alignment of each one of the optical filters of the color filter device 4 within the light channel 22 when the color filter device 4 is moved to a corresponding one of four corner portions of the platform 51. The filter-shifting unit 5 further includes a permanent magnet unit consisting of four elongate permanent magnet members 50a, 50b, 50c, 50d that are mounted on and that extend along four sides of the rectangular formation formed by the four optical filters of the color filter device 4. Thus, the permanent magnet members 50a, 50b, 50c, 50d move with the color filter device 4 on the platform 51. The filter-shifting unit 5 additionally includes an electromagnet unit consisting of four cores 52a, 52b, 52c, 52d, each of which is provided on a respective one of four peripheral sides of the platform 51, and four windings 53a, 53b, 53c, 53d, each of which is disposed around a respective one of the cores 52a, 52b, 52c, 52d.

FIG. 2 illustrates the color filter device 4 when the transparent filter 40 is aligned within the light channel 22. When the switching controller 9 is controlled by the signal-processing unit 7 to supply electrical current to the winding 53d, a magnetic repulsion force is generated with the permanent magnet member 50c in order to move the color filter device 4 on the platform 51 and align the color filter 41 within the light channel 22. From the state shown in FIG. 2, when the switching controller 9 is controlled by the signal-processing unit 7 to supply electrical current to the winding 53a, a magnetic repulsion force is generated with the permanent magnet member 50d in order to move the color filter device 4 on the platform 51 and align the color filter 41" within the light channel 22.

The light that leaves the color filter device 4 exits the wide second end 21 of light collector 2 and is received by the photoelectric sensor 6. The photoelectric sensor 6 produces an analog output signal corresponding to the light that is received thereby.

The signal-processing unit 7 includes an analog-to-digital (A/D) converter 70 that is connected to the photoelectric sensor 6 to receive the analog output signal therefrom and that converts the analog output signal into a corresponding digital signal, a processor 71 connected to the converter 70 to process and analyze the digital signal and further connected to the light source controller 31 and the switching controller 9 to control operation of the latter, and a display 72 connected to and controlled by the processor 71 to display a calculated result of the processor 71 that corresponds to the color property of the test object 1 thereon.

Figure 3:
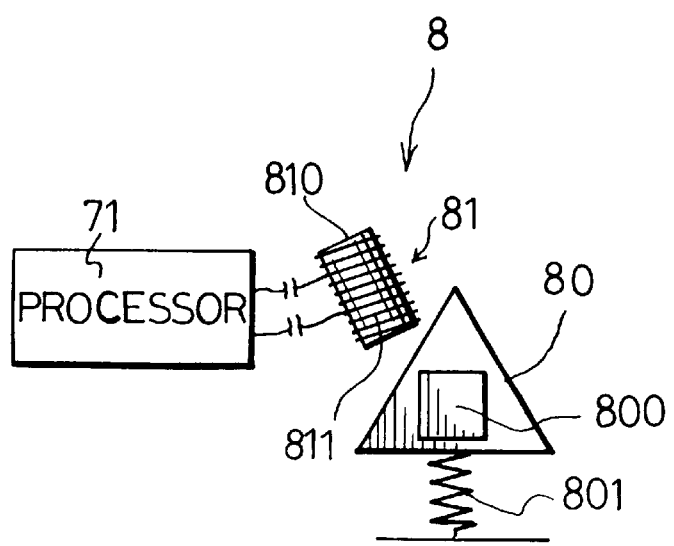
FIG. 3 is a schematic view of a shutter device of the preferred embodiment.

Referring to FIGS. 1 and 3, the shutter device 8 is mounted in the light collector 2 adjacent to the test opening 20, and is operable so as to open and close the latter. The shutter device 8 includes a shutter plate 80 disposed transverse to the light channel 22 and movable between open and closed positions, a spring 801 for biasing the shutter plate 80 to the closed position, and a shutter control unit 81 operable so as to move the shutter plate 80 to the open position against action of the spring 801. The shutter plate 80 is made of a magnetically attractive material, such as iron. The shutter control unit 81 is connected to and is controlled by the processor 71 of the signal-processing unit 7. The shutter control unit 81 includes a core 810 and a winding 811 disposed around the core 810 and connected to the processor 71. When the processor 71 supplies electrical current to the winding 811, a magnetic force is generated to move the shutter plate 80 to the open position. The shutter plate 80 has one side opposite to the test opening 20 provided with a standard colored label 800 to permit self-calibration of the light sources by comparing with preset data in the signal-processing unit 7.

In use, when it is desired to determine the color of light that is emitted by a light-emitting test object 1, the test opening 20 of the light collector 2 is brought close to the test object 1, and the shutter-plate 80 is moved to the open position so that the light leaving the light-emitting test object 1 can enter into the light channel 22. The filter-shifting unit 5 moves the color filter device 4 such that the color filters 41, 41', 41" are aligned in sequence within the light channel 22. Thus, three detected light outputs are received by the photoelectric sensor 6 in sequence from the color filter device 4, thereby resulting in the sequential generation of three analog output signals. The analog output signals are converted into digital signals by the converter 70. The digital signals are processed by the processor 71 to obtain a color value that is subsequently shown on the display 72.

When it is desired to determine the color of the surface of a non-light-emitting test object 1, the shutter plate 80 is moved to the open position, and the light sources 30 are activated by the light source controller 31 in sequence so as to generate the light outputs of different wavelengths. The light outputs from the light sources 30 pass through the test opening 20 and are reflected by the test object 1 into the light channel 22. At this time, the filter-shifting unit 5 moves the color filter device 4 such that the transparent filter 40 is aligned within the light channel 22. Thus, because the light sources 30 are activated in sequence, the photoelectric sensor 6 can receive different detected light outputs from the transparent filter 40, thereby resulting in the sequential generation of analog output signals. The analog output signals are converted into digital signals by the converter 70. The digital signals are processed by the processor 71 to obtain a color value that is subsequently shown on the display 72.

When it is desired to perform a self-calibrating operation to take into account stability of the light sources 30, the light sources 30 are operated in sequence without opening the shutter plate 80. The light outputs of the light sources 30 are reflected by the label 800 on the shutter plate 80 to the transparent filter 40 of the color filter device 4. The detected light outputs received by the photoelectric sensor 6 from the transparent filter 40 are converted into analog output signals which, in turn, are converted into digital signals by the converter 70. The digital signals are received by the processor 71, which then performs a self-calibrating routine.

It has thus been shown that the color analyzer of this invention is capable of determining the color property of a light-emitting or a non-light-emitting test object, thereby resulting in enhanced utility. In addition, no prisms or diffraction gratings are employed to result in a relatively simple construction that facilitates production and lowers production costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A color analyzer for determining color property of a test object, the color property being color of light that is emitted by the test object when the test object is a light-emitting test object, the color property being color of a surface of the test object when the test object is a non-light-emitting test object, said color analyzer comprising:

a light collector having a first end formed with a test opening and adapted to be placed in juxtaposition with the test object, a second end, and a light channel extending from said test opening to said second end, said test opening being adapted to permit entry of the light from the test object into said light channel;

a lighting unit mounted on said light collector and operable when the test object is a non-light-emitting test object in order to generate light outputs of different wavelengths that pass through said test opening so as to be reflected by the surface of the non-light-emitting test object into said light channel via said test opening;

a color filter device movably disposed in said light collector and including four optical filters, one of said optical filters being a transparent filter, other three of said optical filters being color filters;

a filter-shifting unit associated with said color filter device and operable so as to move said color filter device in said light collector in order to align said transparent filter within said light channel when the test object is a non-light-emitting test object, and in order to align sequentially said color filters within said light channel when the test object is a light-emitting test object;

a photoelectric sensor for producing an electric output signal corresponding to light that leaves said color filter device; and a signal-processing unit connected to said photoelectric sensor to process the output signal of said photoelectric sensor in order to determine the color property of the test object.

2. The color analyzer as claimed in claim 1, wherein said lighting unit includes a plurality of light sources that are equiangularly disposed on said light collector and that are operable in sequence so as to generate the light outputs of different wavelengths.

3. The color analyzer as claimed in claim 2, wherein said lighting unit includes a plurality of differently colored light emitting diodes that serve as said light sources.

4. The color analyzer as claimed in claim 2, wherein said light sources incline by a 45° angle toward said test opening.

5. The color analyzer as claimed in claim 4, wherein said light collector is a hollow member, and said light sources are mounted on an inner wall surface of said light collector at said second end.

6. The color analyzer as claimed in claim 5, wherein said lighting unit further includes a light source controller connected to said light sources and controlled by said signal-processing unit so as to control activating sequence of said light sources and intensity of the light outputs of said light sources.

7. The color analyzer as claimed in claim 5, wherein said light collector is formed as a hollow cone-shaped member made of an opaque material, and has a narrow end that serves as said first end and a wide end that serves as said second end.

8. The color analyzer as claimed in claim 1, wherein said optical filters are disposed side-by-side in a common plane transverse to said light channel, and form four corner portions of a rectangular formation.

9. The color analyzer as claimed in claim 8, wherein said light collector is a hollow member, and said filter-shifting unit includes a transparent platform that is disposed in said light collector transverse to said light channel and that has said color filter device movably provided thereon, a permanent magnet unit mounted on said color filter device so as to be movable therewith on said platform, and an electromagnet unit mounted on a periphery of said platform and operable so as to generate a magnetic repulsion force with said permanent magnet unit in order to move said color filter device on said platform and align a desired one of said optical filters within said light channel.

10. The color analyzer as claimed in claim 9, wherein said permanent magnet unit includes four elongate permanent magnet members that are mounted on and that extend along four sides of the rectangular formation formed by said optical filters, said platform being rectangular in shape and having a size sufficient to permit alignment of each one of said optical filters within said light channel when said color filter device is moved to a corresponding one of four corner portions of said platform, said electromagnet unit including four cores, each of which is provided on a respective one of four sides of said platform, and four windings, each of which is disposed around a respective one of said cores.

11. The color analyzer as claimed in claim 10, further comprising a switching controller connected to said windings and controlled by said signal-processing unit so as to control supply of electric current to said windings.

12. The color analyzer as claimed in claim 1, further comprising a shutter device mounted in said light collector adjacent to said test opening, and operable so as to open and close said test opening.

13. The color analyzer as claimed in claim 12, wherein said shutter device includes a shutter plate disposed transverse to said light channel and movable between open and closed positions, a spring for biasing said shutter plate to the closed position, and a shutter control unit operable so as to move said shutter plate to the open position against action of said spring.

14. The color analyzer as claimed in claim 13, wherein said shutter plate is made of a magnetically attractive material, said shutter control unit including a core and a winding disposed around said core and connected to said signal-processing unit, said signal-processing unit supplying electrical current to said winding to generate a magnetic force for moving said shutter plate to the open position.

15. The color analyzer as claimed in claim 13, wherein said shutter plate has one side opposite to said test opening and provided with a standard colored label to permit self-calibration of said lighting unit by comparing with preset data in said signal-processing unit.

16. The color analyzer as claimed in claim 1, wherein said color filters cooperate with spectral response of said photoelectric sensor to form CIE 1931 color matching functions.

17. A color analyzer for determining color of light that is emitted by a light-emitting test object, said color analyzer comprising:

a hollow light collector having a first end formed with a test opening and adapted to be placed in juxtaposition with the test object, a second end, and a light channel extending from said test opening to said second end, said test opening being adapted to permit entry of the light from the test object into said light channel;

a color filter device movably disposed in said light collector and including at least three optical filters, said optical filters being disposed side-by-side in a common plane transverse to said light channel, and forming corner portions of a rectangular formation;

a filter-shifting unit associated with said color filter device and operable so as to move said color filter device in said light collector in order to align sequentially said optical filters within said light channel, said filter-shifting unit including a transparent platform that is disposed in said light collector transverse to said light channel and that has said color filter device movably provided thereon, a permanent magnet unit mounted on said color filter device so as to be movable therewith on said platform, and an electromagnet unit mounted on a periphery of said platform and operable so as to generate a magnetic repulsion force with said permanent magnet unit in order to move said color filter device on said platform and align a desired one of said optical filters within said light channel;

a photoelectric sensor for producing an electric output signal corresponding to light that leaves said color filter device; and a signal-processing unit connected to said photoelectric sensor to process the output signal of said photoelectric sensor in order to determine the color of the light emitted by the test object.

18. The color analyzer as claimed in claim 17, wherein said permanent magnet unit includes four elongate permanent magnet members that are mounted on and that extend along four sides of the rectangular formation formed by said optical filters, said platform being rectangular in shape and having a size sufficient to permit alignment of each one of said optical filters within said light channel when said color filter device is moved to a corresponding one of four corner portions of said platform.

19. The color analyzer as claimed in claim 18, wherein said electromagnet unit includes four cores, each of which is provided on a respective one of four sides of said platform, and four windings, each of which is disposed around a respective one of said cores.

20. The color analyzer as claimed in claim 19, further comprising a switching controller connected to said windings and controlled by said signal-processing unit so as to control supply of electric current to said windings.

21. The color analyzer as claimed in claim 17, further comprising a shutter device mounted in said light collector adjacent to said test opening, and operable so as to open and close said test opening.

22. The color analyzer as claimed in claim 21, wherein said shutter device includes a shutter plate disposed transverse to said light channel and movable between open and closed positions, a spring for biasing said shutter plate to the closed position, and a shutter control unit operable so as to move said shutter plate to the open position against action of said spring.

23. The color analyzer as claimed in claim 22, wherein said shutter plate is made of a magnetically attractive material, said shutter control unit including a core and a winding disposed around said core and connected to said signal-processing unit, said signal-processing unit supplying electrical current to said winding to generate a magnetic force for moving said shutter plate to the open position.

24. The color analyzer as claimed in claim 17, wherein said optical filters are color filters that cooperate with spectral response of said photoelectric sensor to form CIE 1931 color matching functions.

25. A color analyzer for determining color of a surface of a non-light-emitting test object, said color analyzer comprising:
- a hollow light collector having a first end formed with a test opening and adapted to be placed in juxtaposition with the test object, a second end, and a light channel extending from said test opening to said second end;
- a lighting unit including a plurality of light sources that are equiangularly disposed on said light collector and that are operable in sequence so as to generate light outputs of different wavelengths that pass through said test opening so as to be reflected by the surface of the test object into said light channel via said test opening, said light sources being mounted on an inner wall surface of said light collector at said second end and inclining by a 45° angle toward said test opening;
- a photoelectric sensor for producing an electric output signal corresponding to light that leaves said light channel at said second end of said light collector; and
- a signal-processing unit connected to said photoelectric sensor to process the output signal of said photoelectric sensor in order to determine the color of the surface of the test object.

26. The color analyzer as claimed in claim 25, wherein said lighting unit includes a plurality of differently colored light emitting diodes that serve as said light sources.

27. The color analyzer as claimed in claim 25, wherein said lighting unit further includes a light source controller connected to said light sources and controlled by said signal-processing unit so as to control activating sequence of said light sources and intensity of the light outputs of said light sources.

28. The color analyzer as claimed in claim 25, wherein said light collector is formed as a hollow cone-shaped member made of an opaque material, and has a narrow end that serves as said first end and a wide end that serves as said second end.

29. The color analyzer as claimed in claim 25, further comprising a color filter device disposed in said light collector and including a transparent filter aligned within said light channel.

30. The color analyzer as claimed in claim 25, further comprising a shutter device mounted in said light collector adjacent to said test opening, and operable so as to open and close said test opening.

31. The color analyzer as claimed in claim 30, wherein said shutter device includes a shutter plate disposed transverse to said light channel and movable between open and closed positions, a spring for biasing said shutter plate to the closed position, and a shutter control unit operable so as to move said shutter plate to the open position against action of said spring.

32. The color analyzer as claimed in claim 31, wherein said shutter plate is made of a magnetically attractive material, said shutter control unit including a core and a winding disposed around said core and connected to said signal-processing unit, said signal-processing unit supplying electrical current to said winding to generate a magnetic force for moving said shutter plate to the open position.

33. The color analyzer as claimed in claim 31, wherein said shutter plate has one side opposite to said test opening and provided with a standard colored label to permit self-calibration of said lighting unit by comparing with preset data in said signal-processing unit.

* * * * *